(12) United States Patent
Furumoto et al.

(10) Patent No.: US 8,065,289 B2
(45) Date of Patent: Nov. 22, 2011

(54) INFORMATION PROVIDING SYSTEM AND INFORMATION PROVIDING METHOD

(75) Inventors: Yukihiko Furumoto, Kawasaki (JP); Osamu Takizawa, Nagano (JP)

(73) Assignee: Fujitsu Limited, Kawasaki (JP)

( * ) Notice: Subject to any disclaimer, the term of this patent is extended or adjusted under 35 U.S.C. 154(b) by 633 days.

(21) Appl. No.: 12/042,110

(22) Filed: Mar. 4, 2008

(65) Prior Publication Data

US 2008/0313151 A1 Dec. 18, 2008

(30) Foreign Application Priority Data

Mar. 19, 2007 (JP) ................................. 2007-071660
Feb. 5, 2008 (JP) ................................. 2008-025697

(51) Int. Cl.
*G06F 17/30* (2006.01)

(52) U.S. Cl. ......... 707/706; 707/748; 707/749; 707/750

(58) Field of Classification Search .............. 707/3, 706, 707/748–750
See application file for complete search history.

(56) References Cited

U.S. PATENT DOCUMENTS

| | | | |
|---|---|---|---|
| 5,159,667 A * | 10/1992 | Borrey et al. ................. | 715/205 |
| 5,812,999 A * | 9/1998 | Tateno ................................. | 1/1 |
| 6,397,212 B1 * | 5/2002 | Biffar ........................... | 707/704 |
| 6,466,940 B1 * | 10/2002 | Mills ................................. | 1/1 |
| 6,523,044 B1 * | 2/2003 | Muramoto et al. .................... | 1/1 |
| 6,694,331 B2 * | 2/2004 | Lee ............... | 707/706 |
| 7,046,865 B2 * | 5/2006 | Kasutani ....................... | 382/305 |
| 7,047,238 B2 * | 5/2006 | Tada et al. ............................. | 1/1 |
| 7,136,758 B2 * | 11/2006 | Patterson et al. ............... | 702/19 |
| 7,149,363 B2 * | 12/2006 | Fukuda .......................... | 382/250 |
| 7,326,846 B2 * | 2/2008 | Terada .............................. | 84/609 |
| 7,392,278 B2 * | 6/2008 | Chen et al. ............................. | 1/1 |
| 7,464,109 B2 * | 12/2008 | Modi ..................................... | 1/1 |
| 7,484,648 B2 * | 2/2009 | Gschwend et al. ............. | 227/10 |
| 7,505,964 B2 * | 3/2009 | Tong et al. ............................. | 1/1 |
| 7,533,267 B2 * | 5/2009 | Yoshimura .................... | 713/176 |
| 2002/0032723 A1 * | 3/2002 | Johnson et al. ............... | 709/203 |
| 2005/0207645 A1 * | 9/2005 | Nishimura et al. ........... | 382/170 |
| 2005/0267691 A1 * | 12/2005 | Kurita et al. .................... | 702/20 |
| 2006/0098231 A1 * | 5/2006 | Konishi ....................... | 358/3.21 |
| 2007/0139233 A1 * | 6/2007 | Matsuda ......................... | 341/50 |
| 2007/0174226 A1 * | 7/2007 | Saito ............................... | 706/60 |
| 2007/0198587 A1 * | 8/2007 | Kobayashi et al. ........ | 707/104.1 |
| 2009/0018832 A1 * | 1/2009 | Mukaigaito et al. .......... | 704/251 |

OTHER PUBLICATIONS

Robert Osada, Thomas Funkhouser, Bernard Chazelle, and David Dobkin, "Shape Distributions", ACM Transactions on Graphics, vol. 21, No. 4, pp. 807-832, Oct. 2002, http://www.cs.princeton.edu/~funk/tog02.pdf.

Pu Jiantao, Liu Yi, Xin Guyu, Zha Hongbin, Liu Weibin, Yusuke Uehara, "3D Model Retrieval Based on 2D Slice Similarity Measurements", Proceedings of the Second International Symposium on 3D Data Processing, Visualization and Transmission (3DPVT'04), pp. 95-101, 2004.

(Continued)

*Primary Examiner* — Hanh Thai

(74) *Attorney, Agent, or Firm* — Staas & Halsey LLP

(57) ABSTRACT

According to an aspect of an embodiment, a method comprises editing information related to a part according to a user operation, extracting characteristic information representing a characteristic of the part from information of an object to be edited when an operation to select the part is performed, searching a database for information similar to the characteristic information, searching the database for knowledge information related to the characteristic information, and displaying the knowledge information on a display unit.

11 Claims, 19 Drawing Sheets

OTHER PUBLICATIONS

Michael Kazhdan and Thomas Funkhouser, "Harmonic 3D Shape Matching", SIGGRAPH 2002 Technical Sketches, p. 191, Jul. 2002, http://www.cs.princeton.edu/gfx/proj/shape/s2002_kazhdan_ts.pdf.

* cited by examiner

FIG. 2

| CHARACTERISTIC INFORMATION ID | TYPE | VALUE |
|---|---|---|
| 9401 | PART NAME | Upper |
| 9402 | PART NAME | Cover |
| 9403 | WEIGHT | 20g TO 30g |
| 9404 | MATERIAL | STAINLESS |
| 9405 | MATERIAL | MAGNETISM |
| 9406 | SHAPE | xxxx···· |
| 9407 | PART NAME | Lower |
| 9408 | MATERIAL | NONMAGNETISM |
| 9409 | WEIGHT | 40g TO 50g |
| ... | ... | ... |

FIG. 3

| KNOWLEDGE INFORMATION ID | TYPE | OUTLINE | DETAILS | REGISTRANT | REGISTRATION DATE |
|---|---|---|---|---|---|
| 370231 | NOTE | CRACK OCCURRENCE | xxxxxxxx | TANAKA | 2007/3/4 |
| 370232 | NOTE | SCRATCH OCCURRENCE | xxxxxxxx | SUZUKI | 2007/3/5 |
| 370233 | NOTE | LOW STRENGTH | xxxxxxxx | TAKAHASHI | 2007/3/5 |
| ... | ... | ... | ... | ... | ... |

FIG. 4

| CHARACTERISTIC INFORMATION ID | KNOWLEDGE INFORMATION ID | RELEVANCE | UPDATE DATE |
|---|---|---|---|
| 9401 | 370231 | 50 | 2007/3/4 |
| 9402 | 370231 | 50 | 2007/3/4 |
| 9403 | 370231 | 50 | 2007/3/4 |
| 9401 | 370232 | 50 | 2007/3/5 |
| 9402 | 370232 | 50 | 2007/3/5 |
| 9403 | 370232 | 50 | 2007/3/5 |
| 9404 | 370233 | 50 | 2007/3/5 |
| 9405 | 370233 | 50 | 2007/3/5 |
| 9406 | 370233 | 50 | 2007/3/5 |
| ... | ... | ... | ... |

FIG. 6

OUTLINE INFORMATION

| REGISTRANT | REGISTRATION DATE | OUTLINE |
|---|---|---|
| furu | 06/09/22 | MOVABLE HINGE PORTION CRACK |
| furu | 06/09/22 | REAR COVER CLAW SHAVING |
| furu | 06/09/22 | MOVABLE REAR PANEL IS LARGE |

DETAILS DISPLAY

FIG. 7

DETAILED INFORMATION

REGISTRANT: furu    REGISTRATION DATE: 06/09/22    UPDATE DATE: 06/09/22

OUTLINE
MOVABLE HINGE PORTION CRACK

DETAILS
BECAUSE CORE ROOT R IS ABSENT DUE TO MOLD CRACKING?

FIG. 13

| MATERIAL NAME | CHARACTERISTIC INFORMATION |
|---|---|
| SUS304 | STAINLESS STEEL |
| SUS304 | MAGNETISM |
| SUS430 | STAINLESS STEEL |
| SUS430 | NONMAGNETISM |
| ... | ... |

INFORMATION PROVIDING SYSTEM AND INFORMATION PROVIDING METHOD

CROSS-REFERENCE TO RELATED APPLICATIONS

This application is related to and claims the benefit of priority from Japanese Patent Application No. 2007-71660, filed on Mar. 19, 2007, the entire contents of which are incorporated herein by reference.

This application is related to and claims the benefit of priority from Japanese Patent Application No. 2008-25697, filed on Feb. 5, 2008, the entire contents of which are incorporated herein by reference.

BACKGROUND

1. Field

The present art relates to an information providing system, program, and method which provide knowledge information accumulated in a database and, in particular, to an information providing system, program, and method which effectively realizes accumulation and utilization of knowledge information.

2. Description of the Related Art

In recent years, as a result of the advance of high-mix low-volume production, a business organization generally progresses development projects for similar commercial products parallel to each other. In such an environment, a know-how obtained in development of a certain product may effectively be utilized for development of another product to enable to efficient development the other product.

To accumulate and share know-how information a knowledge management system is developed. The knowledge management system accumulates various know-hows in a database and searches the database for a know-how required or requested by a user.

In a typical knowledge management system, a user performs a search using search keys such as a keyword, a registrant name, and a registration date included in the knowledge information. The user must select an appropriate search key to refer to necessary knowledge information.

An appropriate search key selected by the user can be selected based on understanding of the user related to a knowledge management system and knowledge information to be searched. However, the user rarely understands both the knowledge management system and the knowledge information to be searched. Therefore, the typical knowledge management system does not efficiently provide knowledge information required by a user.

When a user cannot acquire necessary knowledge information or when necessary knowledge information is buried in unnecessary knowledge information, the user cannot refer to the necessary knowledge information. When the user registers knowledge information in the typical knowledge management system, the user must demonstratively perform an operation of registering the knowledge information. For example, the user sets an appropriate keyword to search for a particular knowledge information by considering a state in which the knowledge information is used when registering the knowledge information. Alternatively, the user inputs the knowledge information on the basis of a standard format regulated by the knowledge management system in registration of the knowledge information. The possibility of using the knowledge information registered on the basis of the standard format in the future is unknown. Furthermore, a user having knowledge information to be registered in the knowledge management system is often busy because the user holds an effective knowledge. For this reason, an operation of continuously registering the knowledge information is difficult. Therefore, knowledge information is not easily accumulated in typical knowledge management systems.

When a large number of pieces of knowledge information are accumulated in a knowledge management system, excessive knowledge information may be required to be searched although a search using an appropriate search key is performed. As a result, the user may miss genuine useful knowledge information. One way of solving this problem is to systematically arrange a large number of pieces of knowledge information registered in the knowledge management system into a smaller number of pieces of knowledge information. However, this operation requires an operator having a wide knowledge related to a field described in the knowledge information and a number of operations to refer to a large number of pieces of knowledge information.

As described above, there is a burden on the operator to continuously perform operations, which especially becomes problematic when the operator is busy.

The disclosed technique solves the problems caused by the above discussed typical technique and other systems in order to cause a design support system such as a three-dimensional CAD to effectively handle knowledge information. This technique automatically searches for, accumulates, and arranges pieces of knowledge information in use by a design support system to effectively utilize knowledge information useful to a user.

SUMMARY

According to an aspect of an embodiment, a method comprises; editing information related to a part according to a user operation, extracting characteristic information representing a characteristic of the part from information of an object to be edited when an operation to select the part is performed searching a database for information similar to the characteristic information, searching the database for knowledge information related to the characteristic information, and displaying the knowledge information on a display unit.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a view illustrating an example of a characteristic information table;

FIG. 3 is a view illustrating an example of a knowledge information table;

FIG. 4 is a view illustrating an example of a related information table;

FIG. 6 is a view illustrating an example of a list display screen of outline information;

FIG. 7 is a view illustrating an example of a display screen of detailed information;

FIG. 13 is a view illustrating an example of a material characteristic table;

DETAILED DESCRIPTION OF THE EMBODIMENTS

Figure 1:
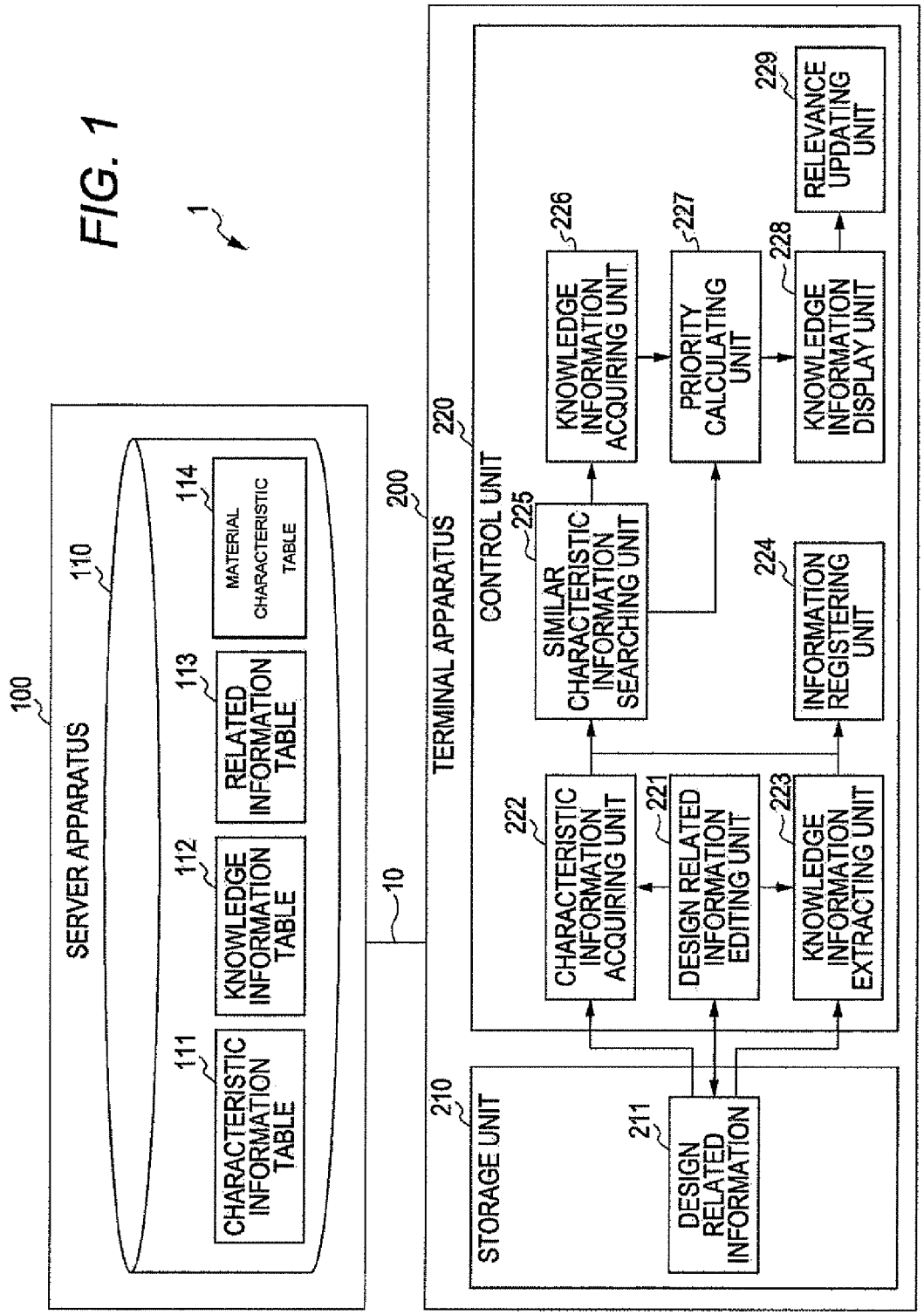
FIG. 1 is a diagram illustrating a configuration of an information providing system.

Reference will now be made in detail to the embodiments, examples of which are illustrated in the accompanying drawings, wherein like reference numerals refer to the like elements throughout. The embodiments are described below to explain the present invention by referring to the figures.

A configuration of an information providing system according to an embodiment will be described. The information providing system according to an embodiment makes it possible to automatically register and search for knowledge information during a design related operation using a design support system without requiring a user to perform an operation to register and search for knowledge information.

FIG. 1 shows a configuration of a design support system including an information providing system according to an embodiment. As shown in FIG. 1, the design support system constituted by a server apparatus 100, a terminal apparatus 200, and a network 10 which connects the server apparatus 100 and the terminal apparatus 200. A plurality of terminal apparatuses 200 may be connected with the server apparatus 100.

The server apparatus 100 stores information shared by the terminal apparatus 200 or the like. The server apparatus 100 has a database (to be referred to as a "DB" hereinafter) 110 having a characteristic information table 111, a knowledge information table 112, a related information table 113, and a material characteristic table 114.

Characteristic information is stored in the characteristic information table 111. The characteristic information is information representing a characteristic inherent in a part. Pieces of characteristic information are acquired from, for example, a part name, a size, a weight, a material, a part shape, etc. The characteristic information related to the part name may be a keyword included in the part name. The pieces of characteristic information related to a size and a weight may be, for example, a range to which a value of the size or the weight belongs or the value of the size or the weight. The characteristic information related to the material is characteristic information acquired from the material characteristic table 114 using a material name set to a part as a key. The characteristic information of a part shape is, for example, an amount of characteristic of the shape used in calculating a degree of similarity of the shape.

FIG. 2 shows an example of the characteristic information table 111. As shown in FIG. 2, the characteristic information table 111 may include a characteristic information ID, a type, a value, and the like. The characteristic ID is an identification number or any other identifier used to uniquely identify various pieces of characteristic information. The type represents a type of characteristic information, and the value is a substance of the characteristic information.

The characteristic information table 111 may store plural pieces of characteristic information held by the same part and having different types. The characteristic information table 111 stores even pieces of characteristic information of different parts as a single piece of characteristic information when the types are the same types and when the values are the same values. As types of pieces of characteristic information, examples of part names will be described below. For example, a part having a part name "Upper-Cover" has two pieces of characteristic information, i.e., a piece of characteristic information having a type "part name" and a value "Upper" and a piece of characteristic information having a type "part name" and a value "Cover". A part name "Lower-Cover" has two pieces of characteristic information, i.e., a piece of characteristic information having a type "part name" and a value "Lower" and a piece of characteristic information having a type "part name" and a value "Cover". In a characteristic table which stores therein these pieces of characteristic information, three records, i.e., a record having a type "part name" and a value "Upper", a record having a type "part name" and a value "Cover", and a record having a type "part name" and a value "Lower" are stored.

As types of pieces of characteristic information, examples of weights will be described below. A range of a value which is a characteristic of a weight is regulated, for example, as an interval of 10 g. For example, a part having a weight of "23 g" has characteristic information having a type "weight" and a value "20 g to 30 g", a part having a weight "45 g" has characteristic information have a type "weight" and a value "40 g to 50 g" and a part having a weight "29 g" has characteristic information having a type "weight" and a value "20 g to 30 g". In a characteristic information table which stores therein the pieces of characteristic information of the three parts, two records, i.e., a record having a type "weight" and a value "20 g to 30 g" and a record having a type "weight" and a value "40 g to 50 g" are stored.

As types of pieces of characteristic information, examples of characteristics of materials will be described below. In order to acquire characteristic information of a material from the material, a material characteristic table in which pieces of characteristic information of different materials are registered is prepared for the server 100 in advance. A piece of characteristic information obtained from the material characteristic table 114 by using a material name extracted from a part as a key is defined as a piece of characteristic information of the part. For example, a material name "SUS304" is extracted from a part having a material "SUS304", and a piece of characteristic information of the material is acquired from the material characteristic table 114 by using "SUS304" as a key. Pieces of characteristic information "stainless steel" and "magnetism" are obtained from the material characteristic table 114 on the basis of the material name "SUS304". From the part, a piece of characteristic information having a type "material" and a value "stainless steel" and a piece of characteristic information having a type "material" and a value "magnetism" are obtained. A material name "SUS430" is extracted from the part having the material "SUS430". A piece of characteristic information of a material is acquired from the material characteristic table 114 by using "SUS430" as a key. A piece of characteristic information having "stainless steel" and "nonmagnetism" is obtained from the material characteristic table 114 on the basis of the material name "SUS430". From the part, a piece of characteristic information having a type "material" and a value "stainless steel" and a piece of characteristic information having a type "material" and a value "nonmagnetism" are obtained. In a characteristic information table in which the pieces of characteristic information of the two parts are stored, three records, i.e., a record having a type "material" and a value "stainless steel", a record having a type "material" and a value "magnetism", and a record having a type "material" and a value "nonmagnetism" are stored.

Examples of amounts of characteristic of part shapes will be described in detail below as types of pieces of characteristic information. An amount of characteristic of a shape is calculated from shape data of a part according to a predetermined procedure (will be described in detail below). When two different parts, i.e., part A and part B are the same parts, the calculated amounts of characteristic are equal to each other. When the value is expressed by "xxxx . . . ", in a characteristic table in which the pieces of characteristic information of the two parts are stored, one record having a type "shape" and a value "xxxx . . . " is stored.

The knowledge information table 112 stores knowledge information. The knowledge information is information representing a know-how related to a part. The knowledge information includes, for example, trouble information, a notandum, and reference information.

FIG. 3 shows an example of the knowledge information table 112. The knowledge information table 112 has item(s) such as a knowledge information ID, a type, an outline, details, a registrant, and a registration date. The knowledge information ID is an identifier such as an identification number uniquely identifying each piece of knowledge information. The type indicates a type of knowledge information. The outline is a summary of the knowledge information. The details are a substance of the knowledge information. The registrant is a registrant of the knowledge information or a source of the knowledge information. The registration date is a date on which the knowledge information is registered.

The related information table 113 stores related information. The related information indicates a relevance between a piece of characteristic information stored in the characteristic information table 111 and a piece of knowledge information stored in the knowledge information table 112.

FIG. 4 shows an example of the related information table 113. The related information table 113 has item(s) such as a characteristic information ID, a knowledge information ID, a relevance, and an update date. The characteristic information ID is an identifier such as an identification number to uniquely identifying characteristic information stored in the characteristic information table 111. The knowledge information ID may be an identification number uniquely identifying the pieces of knowledge information stored in the knowledge information table 112.

The relevance indicates a strength of a relationship (similarity) between characteristic information identified by the characteristic information ID and knowledge information identified by the knowledge information ID. The update date is a date on which a value of relevance is updated last.

The terminal apparatus 200 is an information processing terminal used to perform an operation by an implementer which is in charge of a design related service. The terminal apparatus 200 has a storage unit 210, a control unit 220, an input device (not shown), a display screen (not shown), and the like.

The storage unit 210 stores various pieces of information including design related information 211. The design related information 211 is used in a design related service. The design related information 211 corresponds to, for example, CAD (Computer Aided Design) data including a three-dimensional shape, CAM (Computer Aided Manufacturing) data, and CAE (ComputerAided Engineering) data.

The design related information 211 may include a large number of constituent elements sorted out in units of parts of a product to be designed. The design related information 211 has a part name, a size, a weight, a material, a part shape, and the like. A CAD/CAM apparatus generally has a function of adding a comment such as a note to a part. The design related information 211 also has such note information.

The control unit 220 is a control unit which controls the terminal apparatus 200. The control unit 220 has a design related information editing unit 221, a characteristic information acquiring unit 222, a knowledge information extracting unit 223, an information registering unit 224, a similar characteristic information searching unit 225, a knowledge information acquiring unit 226, a priority calculating unit 227, a knowledge information display unit 228, and a relevance updating unit 229. The design related information editing unit 221 edits the design related information 211 according to an operation of a user. The design related information editing unit 221 corresponds to, for example, a general CAD/CAM apparatus.

When a predetermined operation is performed in the design related information editing unit 221, the characteristic information acquiring unit 222 extracts information related to a part to be subjected to the operation from the design related information 211. The characteristic information acquiring unit 222 acquires characteristic information on the basis of the extracted information. The characteristic information acquiring unit 222 acquires all pieces of characteristic information of a type which can be acquired in relation to a part to be subjected to the operation depending on contents of the information stored in the design related information 211.

The predetermined operation mentioned here is a selection related to a specific part in a normal operation while a user uses the terminal apparatus 200. The predetermined operation is, for example, a selection associated with a three-dimensional shape of a part displayed on the display screen of the terminal apparatus 200. A general CAD/CAM apparatus displays a two-dimensional or three-dimensional image showing a tree or a device shape expressing a part configuration of a device to be designed. The user can select a part for the CAD/CAM apparatus by using an input device such as a keyboard or a mouse.

When a predetermined operation is performed using the design related information editing unit 221, the knowledge information extracting unit 223 extracts knowledge information of a part to be subjected to the operation from the design related information 211. A general CAD/CAM can create note information to a part by a note forming function. When the note information is present in the design related information 211, the knowledge information extracting unit 223 extracts the note information held by the design related information 211 as knowledge information.

The predetermined operation mentioned here is, for example, an operation which adds a note to a part by the design related information editing unit 221 or an operation which newly loads design related information on the design support system. Note information added during the operation of adding a note to a part is extracted as knowledge information. When newly designed design related information is loaded, knowledge information is sequentially extracted from the entire loaded information.

When knowledge information is to be extracted, characteristic information of a part to which the knowledge information is related is simultaneously acquired. When the CAD/CAM apparatus forms (creates) a note, a leader line (a pointer or an association) may be drawn from the note to the related part to indicate a corresponding portion. On the basis of the note information selected to extract the knowledge information by the knowledge information extracting unit, leader line information connected to the note information is acquired from the design related information 211. A part connected to the other end of the leader line is searched for on the basis of the leader line information, and the characteristic information acquiring unit 222 may acquire characteristic information of the part from the design related information 211. The control unit 220 sends the knowledge information extracted by the knowledge information extracting unit 223 and the characteristic information acquired by the characteristic information acquiring unit 222 to the information registering unit 224.

The information registering unit 224 registers the characteristic information extracted by the characteristic information acquiring unit 222 and the knowledge information extracted by the knowledge information extracting unit 223 in the characteristic information table 111 and the knowledge information table 112 of the server apparatus 100, respectively. In the registration, the information registering unit 224 searches the characteristic information table 111 and the knowledge information table 112 of the server apparatus 100. The information registering unit 224 determines a status of registration of the characteristic information and the knowledge information to be registered. When the information is not registered, the characteristic information acquired by the characteristic information acquiring unit 222 is registered in the characteristic information table 111, and the knowledge information acquired by the knowledge information extracting unit 223 is registered in the knowledge information table 112. The information registering unit 224 registers in the related information table 113 the characteristic information registered in the characteristic information and related information representing a relevance of the knowledge information registered in the knowledge information table 112.

In this manner, the terminal apparatus 200 extracts the characteristic information and the knowledge information from the design related information 211 to register the characteristic information and the knowledge information in the DB 110 of the server apparatus 100 when a user performs a predetermined operation during a normal operation. Without requiring a conscious registering operation for the knowledge information by the user, the design related knowledge information is automatically accumulated in the DB 110 of the server apparatus 100. The knowledge information to be registered is related to characteristic information of a part acquired by the characteristic information acquiring unit 222 from the design related information 211. For this reason, an adding operation to set a key for searching is unnecessary, and the knowledge information is easily accumulated.

An initial value of a relevance of related information to be registered in the related information table 113 is a predetermined value or a value determined depending on a combination between a type of characteristic information and a type of knowledge information. The information registering unit 224 may be designed not only to automatically register in the DB 110 the characteristic information and the knowledge information but also to register in the DB 110 information input to a predetermined input screen by a user. In this case, the user may also designate a relevance to be registered in the related information table 113.

The similar characteristic information searching unit 225 searches the characteristic information table 111 for characteristic information similar to the characteristic information extracted in the characteristic information acquiring unit 222. More specifically, the similar characteristic information searching unit 225 calculates a degree of similarity between the characteristic information acquired in the characteristic information acquiring unit 222 and characteristic information of the same type stored in the characteristic information table 111, and extracts characteristic information, the obtained degree of similarity of which is equal to or higher than a predetermined value, from the characteristic information table 111.

A scheme for determining a degree of similarity of text information such as a part name or an attribute value will be described below as an example. For example, a text "abc-def" is constituted by two parts, i.e., "abc" and "def", and the text has ½ of a characteristic "abc" and ½ of a characteristic "def". Similarly, a text "xyz_abc__123" has ⅓ of a characteristic "xyz", ⅓ of a characteristic "abc", and ⅓ of a characteristic "123". Since the text "abc-def" and the text "xyz-abc-123" are equal to each other in the characteristic "abc", the degree of similarity between the texts is calculated as ½× ⅓=⅙. A word length, an appearance order of a word, etc., may further be added to the degree of similarity.

A degree of similarity of pieces of numerical information such as volumes, surface areas, densities, and the like of parts may be calculated from ratios of sizes of the values. (A ratio of 1.0 is regarded as a maximum degree of similarity.) A table is formed in advance in which degrees of similarity are defined in units of combinations of ranges of one value and ranges of the other value. The degree(s) of similarity may be calculated with reference to the table.

A degree of similarity between shapes of parts may be calculated by using, for example, a shape distribution method which is a known technique, a slice-based method, or a spherical harmonics method.

The shape distribution method is disclosed in Robert Osada, Thomas Funkhouser, Bernard Chazelle, and David Dobkin, "Shape Distributions", ACM Transactions on Graphics, 21(4), pp. 807-832, October 2002, http://www.cs.princeton.edu/~func/toq02.pdf.

The slice-based method is disclosed in Pu Jiantao, Liu Yi, Xin Guyu, Zha Hongbin, Liu Weibin, Yusuke Uehara, "3D Model Retrieval Based on 2D Slice Similarity Measurements", 3dpvt, pp. 95-101, Second International Symposium on 3D Data Processing, Visualization and Transmission (3DPVT'04), 2004, http://csdl2.computer.org/persagen/DLAbsToc.jsp?resourcePath=/dl/proceeding/&toc=comp/proceedings/3dpvt/2004/2223/00/2223toc.xml&DOI=10.1109/TDPVT.2004.1335181.

The spherical harmonics method is disclosed in Michael Kazhdan and Thomas Funkhouser, "Harmonic 3D Shape Matching", SIGGRAPH 2002 Technical Sketches, p. 191, July, 2002, http://www.cs.princeton.edu/gfx/proj/shape/s2002_kazhdan_ts.pdf.

When characteristic information of the same type and a degree of similarity are to be calculated, the contents of the characteristic information can also be added to the degree of similarity with reference to characteristic information of another type related to the same part. For example, resins of a very large number of types which differ depending on amounts of additive agent are known. A material name and a density are combined to each other to make it possible to more correctly determine a degree of similarity of resins.

The knowledge information acquiring unit 226 searches the knowledge information table 112 for characteristic information searched from the characteristic information table 111 and knowledge information having a relevance which is equal to or higher than a predetermined value in the characteristic information table 111 with reference to the related information stored in the related information table 113.

The priority calculating unit 227 calculates a relevance between the characteristic information extracted in the characteristic information acquiring unit 222 and the knowledge information searched in the knowledge information acquiring unit 226. The priority calculating unit 227 calculates a relevance on the basis of the degree of similarity obtained when similar characteristic information is searched for in the similar characteristic information searching unit 225 and the relevance obtained from the related information table 113 when knowledge information related to the characteristic information is searched for in the knowledge information acquiring unit 226.

For example, it is assumed that characteristic information A is extracted in the characteristic information acquiring unit 222 and that characteristic information B having a degree of similarity x is searched for as characteristic information similar to the characteristic information A. In the knowledge information acquiring unit 226, it is assumed that characteristic information C having a relevance y is searched for as knowledge information related to the characteristic information B. In this case, the priority calculating unit 227 calculates a relevance between the characteristic information A and the knowledge information C to a predetermined calculating formula such that the degree of similarity x and the relevance y are assigned to a predetermined calculating formula.

When the relevance between the characteristic information A and the knowledge information C is registered in the related information table 113 in advance, the relevance recorded on the related information table 113 may be considered.

The knowledge information display unit 228 displays the knowledge information searched for in the knowledge information acquiring unit 226 on the display screen held by the terminal apparatus 200. More specifically, the relevance calculated in the priority calculating unit 227 are aggregated in units of pieces of knowledge information, and outlines of the knowledge information searched for in the knowledge information acquiring unit 226 are displayed as a list such that a high relevance has a high priority. The details of any one of the pieces of knowledge information are displayed depending on an operation of a specific user.

When the relevance are aggregated in units of pieces of knowledge information, the values are not simply summed up, and the relevance may be aggregated depending on type (s) of pieces of related characteristic information. For example, in a design operation, as a name of a part to be designed, a nickname which can be easily understood by a designer may be used in the initial stage of design. However, after the design operation is advanced to some extent, the nickname may be changed into a formal part name. When the formal part name is often a coded ID. An amount of characteristic related to the changed formal part name is hard to be used in searching of knowledge information, In this case, 0 is weighted to a relevance based on the part name to make it possible to obtain a more useful relevant. This setting may be registered in the terminal apparatus 200 by the user.

As the list display of outline(s) of the pieces of knowledge information, a piece of knowledge information having a high relevance can be displayed at an upper position, or a piece of knowledge information having a high relevance can be conspicuously displayed by changing the colors, sizes, and thicknesses of letters, etc. Furthermore, when pages of the list displays of the outlines of the pieces of knowledge information are switched at a predetermined timing, temporal orders or lengths of display time may be changed depending on the relevance.

In this manner, when the user performs a predetermined operation during a normal operation, the terminal apparatus 200 extracts characteristic information from the design related information 211, searches the knowledge information table 112 for knowledge information related to information similar to the characteristic information extracted, and displays the knowledge information. Information similar to the characteristic information extracted can be determined to be similar based on content, usage of a corresponding part, etc. As a result, even though the user does not consciously perform a know-how searching operation, a design related know-how is automatically provided to the user. The terminal apparatus 200 acquires characteristic information from a part selected by the user, searches for a know-how by the acquired characteristic information, and displays knowledge information related to the part which is subjected to the operation. Furthermore, since a piece of knowledge information having a high relevance is preferentially presented, an occasion that allows a piece of useful knowledge information to be seen by the user increases.

The relevance updating unit 229 updates a relevance of related information stored in the related information table 113 on the basis of an operation of a user. More specifically, when the user performs an operation of displaying detail(s) of any one in the list of the outlines of the pieces of knowledge information displayed on the knowledge information display unit 228, it is supposed that a part serving as a trigger for displaying these pieces of knowledge information is strongly related to the knowledge information required to be displayed in detail.

In this case, the relevance updating unit 229 updates the related information table 113 to increase a relevance between the characteristic information of the part and the knowledge information. At this time, if related information representing the relevance between the characteristic information and the knowledge information is not present in the related information table 113, the relevance updating unit 229 registers the related information representing the relevance between the characteristic information and the knowledge information in the related information table 113. The relevance set at this time is preferably set to be higher than a value set when the information registering unit 224 registers the related information in the related information table 113.

Even though detailed information is displayed, when a display time of detailed information is shorter than a predetermined time, it is determined that the knowledge information not necessary. In this case, the related information table 113 may be updated such that a relevance between characteristic information of a part serving as a trigger for displaying the knowledge information and the knowledge information required to be displayed in detail decreases.

More specifically, when a user performs an operation to display the details of the knowledge information in the knowledge information display unit 228, a timer is started first. When the timer continuously displays the details of the knowledge information for a predetermined period of time, the relevance updating unit 229 increases the relevance. When the detailed display of the knowledge information is interrupted for a period of time shorter than the predetermined period of time, the relevance updating unit 229 decreases the relevance. The relevance updating is performed by using the timer.

The relevance updating unit 229 decreases a value of a relevance which does not increase for a predetermined period of time or longer while periodically referring to the related information table 113. More specifically, the relevance updating unit 229 decreases a relevance of related information, an updating date and a relevance increase date of which are older than a predetermined date in the related information stored in the related information table 113. The updating date is updated to the current date.

In this manner, the terminal apparatus 200 updates a relevance of the related information stored in the related information table 113 depending on a usage state of a user. Knowledge information more frequently used may have a high priority of display, and knowledge information which is not frequently used has a low priority of display. With this operation, the user need not explicitly arrange pieces of useless knowledge information by a systematic operation of the pieces of knowledge information. An occasion that allows a piece of unused knowledge information to be displayed on the knowledge information display unit 228 decreases. In contrast to this, an occasion that allows a piece of used knowledge information to be displayed on the knowledge information display unit increases. In this manner, utilization of a piece of useful knowledge information which is frequently used is further accelerated.

In the configuration shown in FIG. 1, information is arranged in the server apparatus 100, and all the processing units are arranged in the terminal apparatus 200. However, the arrangement may be appropriately changed. Some or all of the processing units arranged in the server apparatus 100 may be arranged in the terminal apparatus 200. Alternatively, some or all of the processing units arranged in the terminal apparatus 200 may be arranged in the server apparatus 100.

Figure 5:
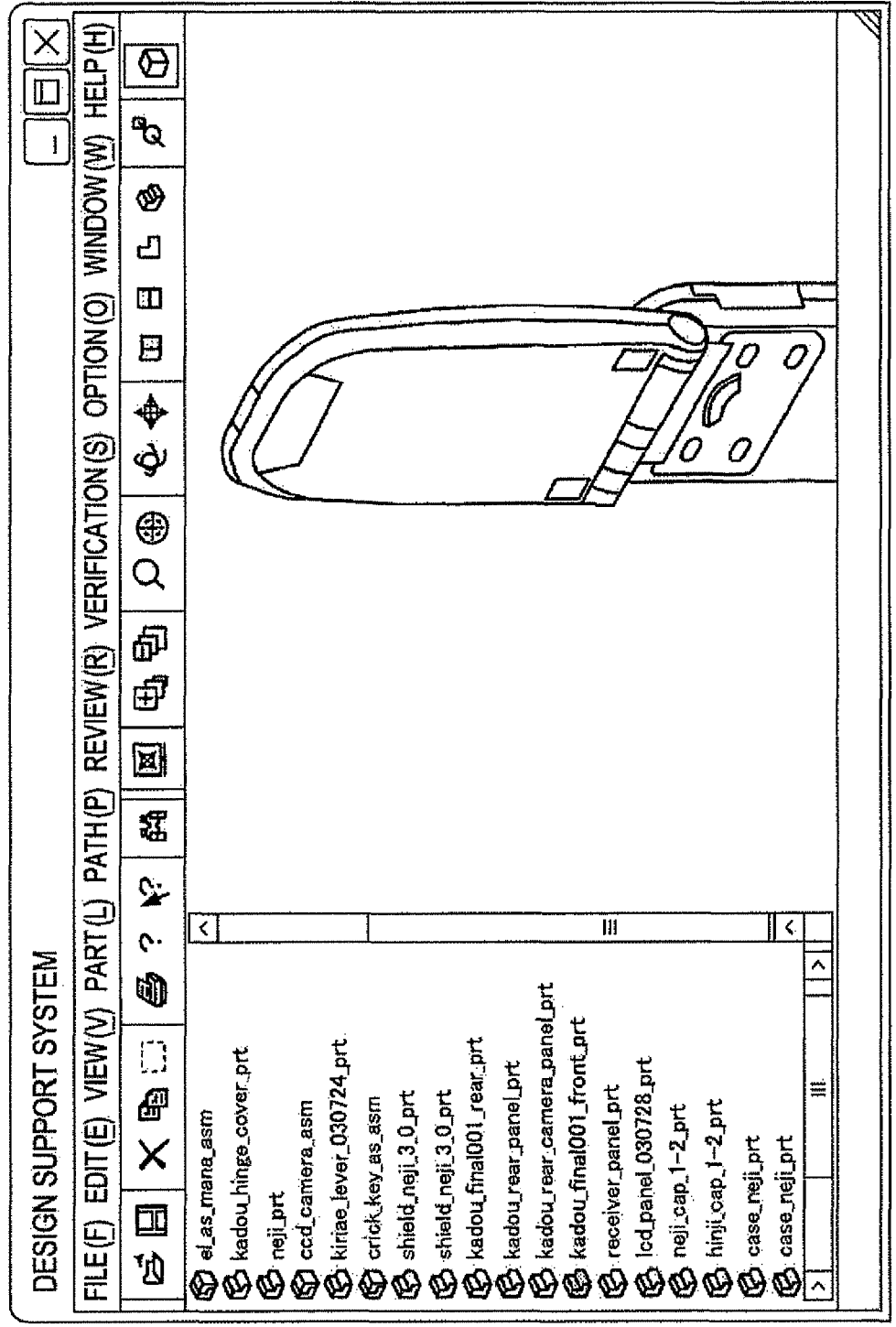
FIG. 5 is a view illustrating an example of an editing screen of design related information.

An example of a processing screen displayed on a display screen of the terminal apparatus 200 will be described below. FIG. 5 shows an example of an editing screen of design related information. In this example, a three-dimensional shape of a cellular mobile phone is displayed. In this screen, when a user selects a hinge portion, an outline information screen as shown in FIG. 6 is displayed by the knowledge information display unit 228, and a list of outlines of pieces of knowledge information related to the hinge portion as the part is displayed. The position and the size of the screen can be arbitrarily changed by the user.

In the outline information screen, the user performs an operation of obtaining a detailed display of any one of the outlines. The detailed information screen as shown in FIG. 7 is displayed depending on an operation. At this time, the relevance updating unit 229 increases a relevance between the characteristic information related to the part of the hinge portion and the knowledge information displayed in detail. A button or the like may be arranged which is used to cause the user to evaluate a relation between a part and knowledge information. Depending on an operation for the button or the like, the relevance updating unit 229 updates the relevance set in the related information table 113.

Figure 14:
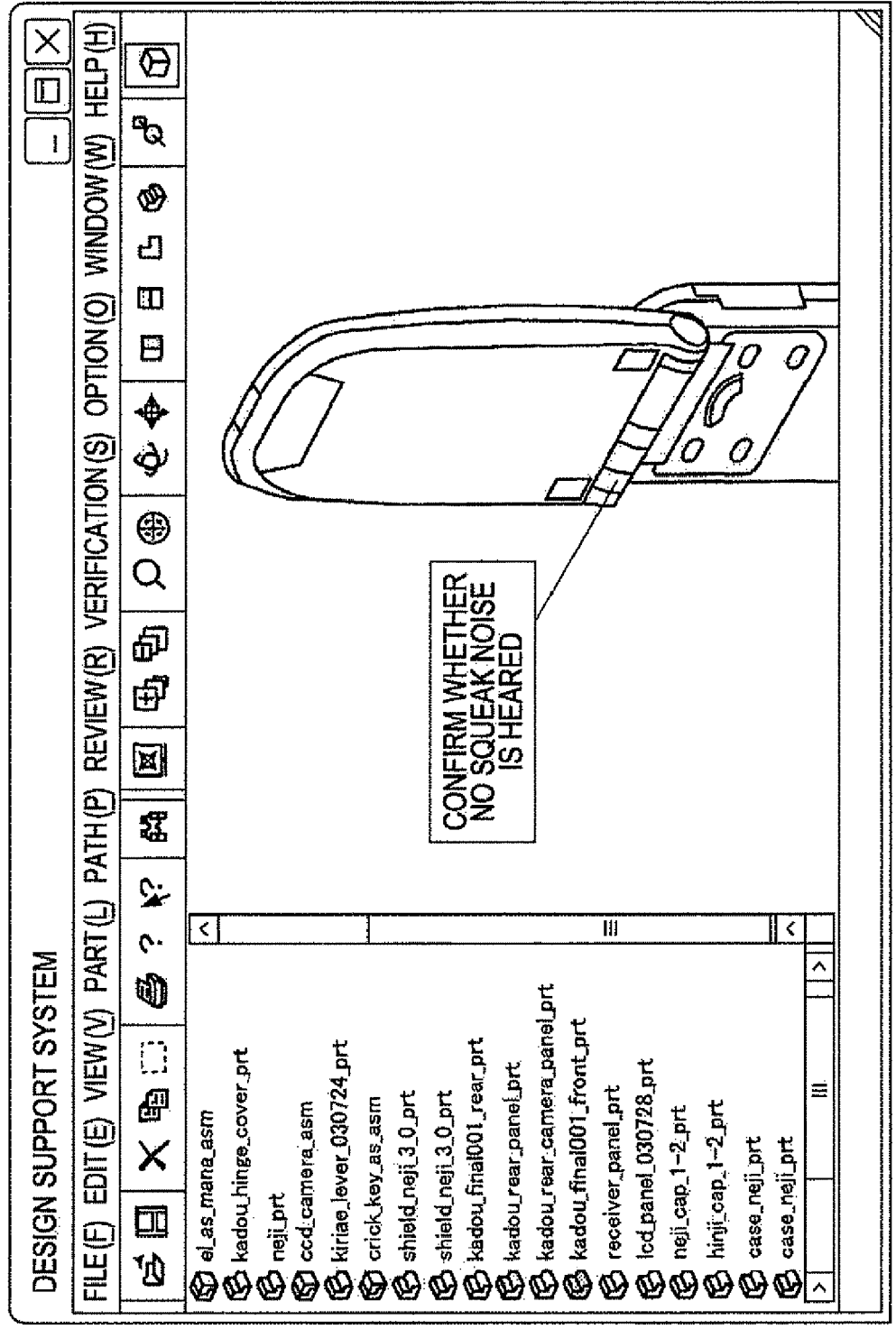
FIG. 14 is a view illustrating an example in which a note is added to the editing screen example in FIG. 5.

FIG. 14 shows an example in which a note is added to the editing screen example in FIG. 5. In this example, a three-dimensional shape of a cellular mobile phone is displayed, a leader line is drawn from the hinge portion of the cellular mobile phone, and a note "Confirm whether no squeak noise is heard" is displayed.

When the note is formed in the design support system, design support system design related information is searched for note information. The design support system searches the leader line information of the searched note information for a related part. The design support system registers in the DB 110 of the server apparatus 100 characteristic information of the searched part, knowledge information extracted from the note information, and related information between the characteristic information and the knowledge information.

Figure 8:
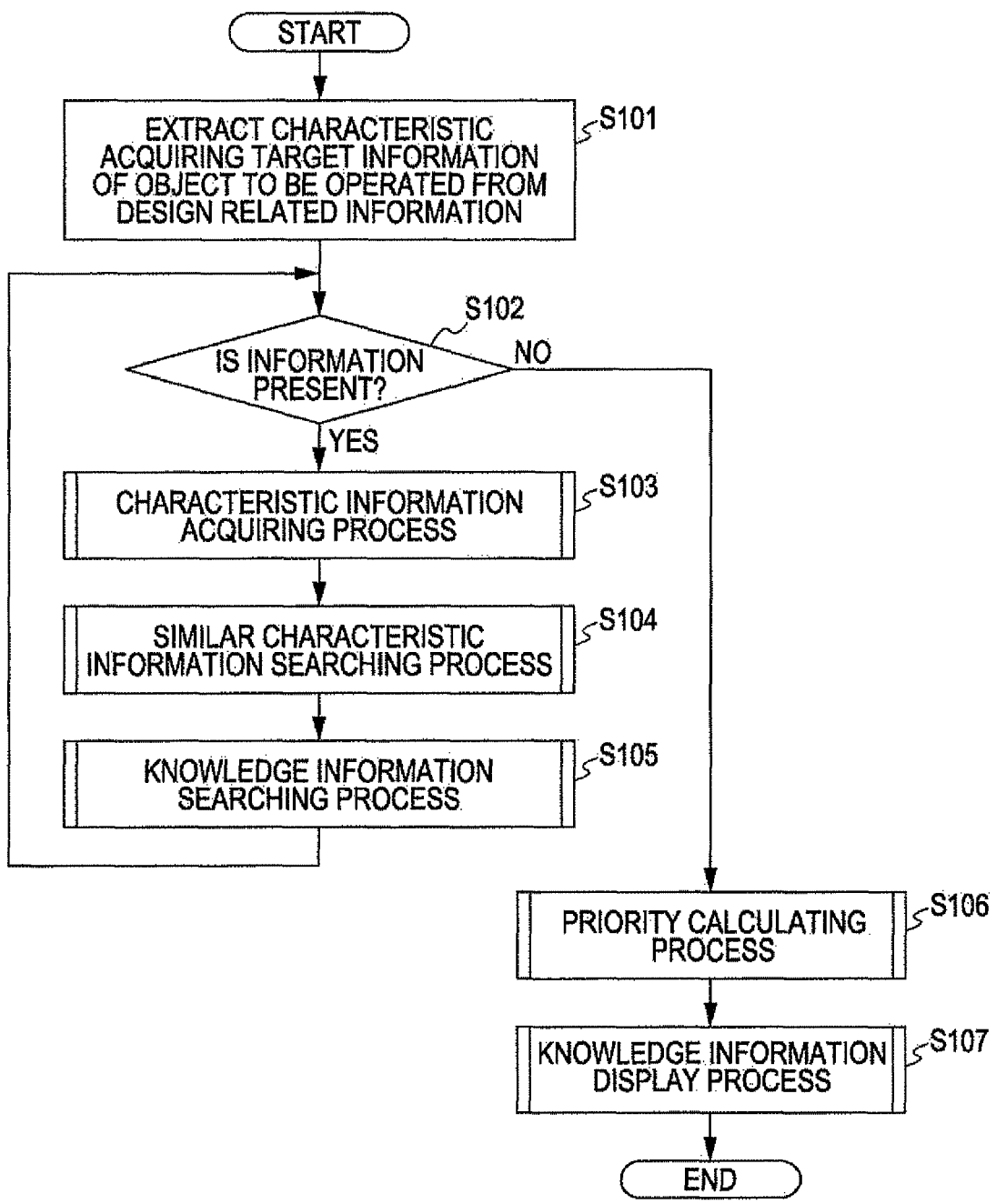
FIG. 8 is a flowchart illustrating a procedure performed when a predetermined operation to select a part in a design related information editing unit is made.

A procedure of the terminal apparatus 200 shown in FIG. 1 will be described below. FIG. 8 shows a procedure when a predetermined operation to select a part in the design related information editing unit 221 is performed. When the operation to select the part in the design related information editing unit 221 is performed, the characteristic information acquiring unit 222 extracts characteristic acquiring target information of a part to be operated from the design related information 211 (operation S101).

When the extracted information is present (Yes in operation S102), a characteristic information acquiring process (will be described later) is executed (operation S103), a similar characteristic information searching process (will be described later) is executed (operation S104), and a knowledge information searching process (will be described later) is executed (operation S105). These processes are repeated as long as the characteristic acquiring target information is present. The series of processes can be executed parallel to each other.

When all the pieces of characteristic acquiring target information are processed (No in operation S102), a priority (relevance) calculating process (will be described later) is executed with respect to the knowledge information acquired in operation S105 (operation S106). A knowledge information display process (will be described later) is executed (operation S107), and the process is ended.

Figure 15:
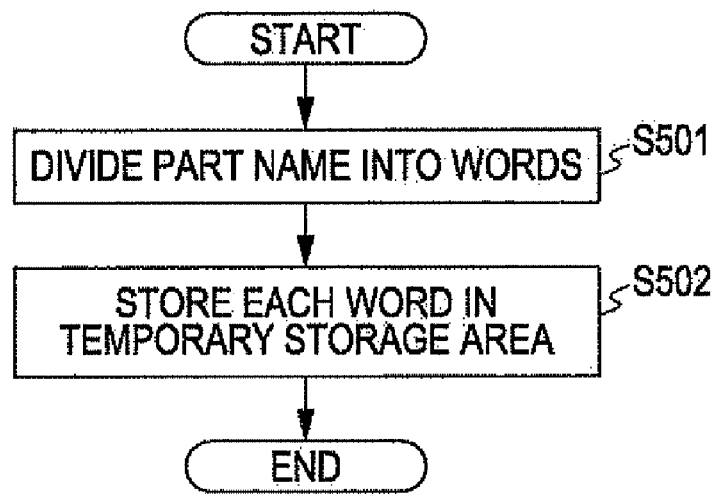
FIG. 15 is a flowchart illustrating a characteristic information acquiring process related to a part name.

FIG. 15 shows a characteristic information acquiring process related to a part name. The characteristic information acquiring process divides a part name extracted by the characteristic acquiring target information in units of words according to regulated dividing letters (operation S501). The characteristic information acquiring process stores the words obtained by the division in a temporary storage area for the subsequent process (operation S502), and the process is ended.

Figure 16:
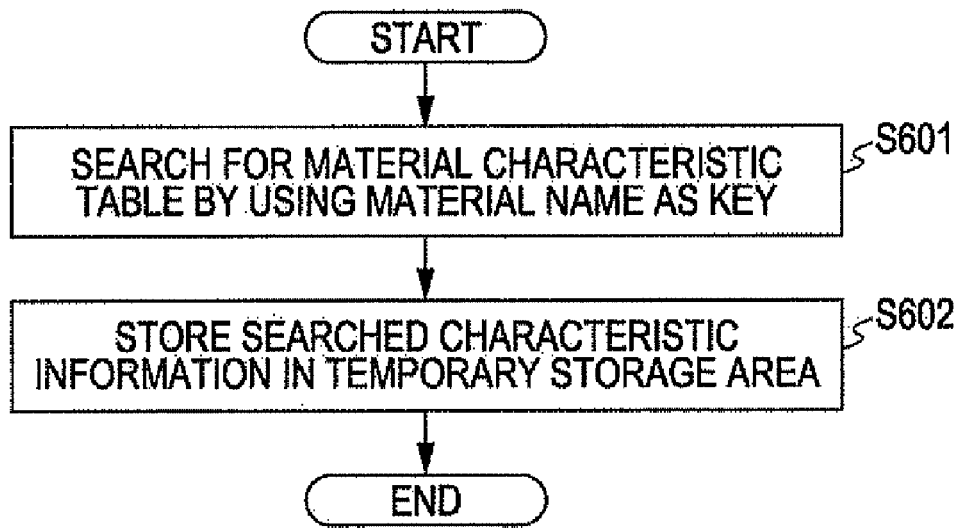
FIG. 16 is a flowchart illustrating a characteristic information acquiring process related to a material.

FIG. 16 shows a characteristic information acquiring process related to a material. The characteristic information acquiring process searches the material characteristic table using a material name extracted as the characteristic acquiring target information as a key (operation S601). The characteristic information acquiring process stores the characteristic information of the material obtained by the searching in the temporary storage area for the subsequent process (operation S602), and the process is ended.

Figure 17:
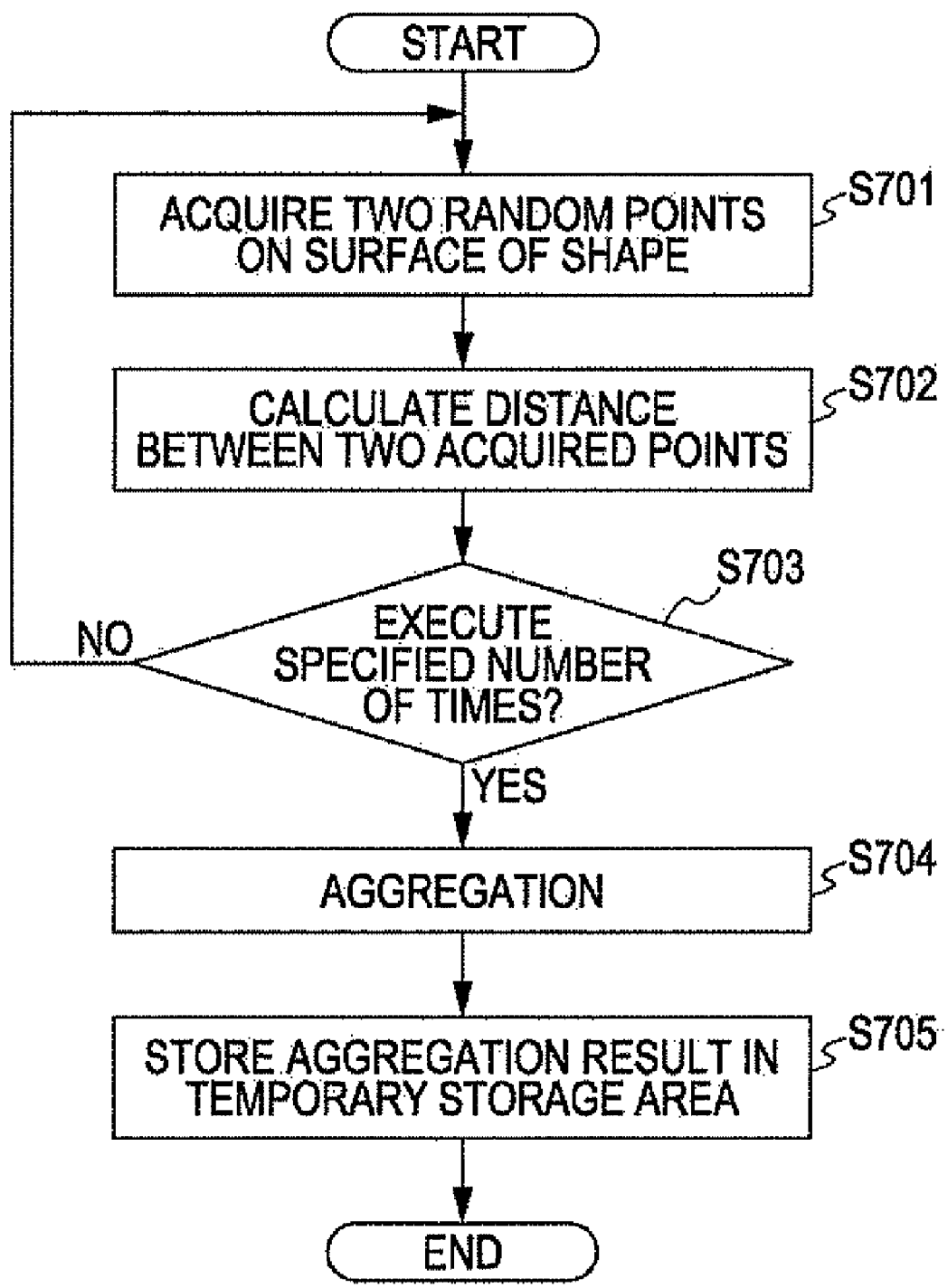
FIG. 17 is a flowchart illustrating a characteristic information acquiring process related to a shape.

FIG. 17 shows a characteristic information acquiring process related to a shape. As an example, characteristic acquisition by the shape distribution method is shown. The characteristic information acquiring process acquires two random points on the surface of a shape extracted as the characteristic acquiring target information (operation S701). The characteristic information acquiring process calculates (an Euclidean) distance between the two points (operation S702). The characteristic information acquiring process returns to operation S701 when the process is not executed at a specified number of times (a regulated number of times) (No in operation S703). The characteristic information acquiring process aggregates calculated distances when the process is executed the specified (predetermined) number of times (Yes in operation S703) (operation S704). By the aggregation, the characteristic information acquiring process forms data corresponding to a histogram in which an abscissa is a distance range between the two points and an ordinate is a frequency. The data is an amount of characteristic of a shape. The characteristic information acquiring process stores an amount of characteristic obtained by aggregation in the temporary storing area for the subsequent process (operation S705), and the process is ended.

With respect to the other characteristic acquiring target information, the characteristic information acquiring process forms characteristic information by a procedure suitable for each piece of information and stores the characteristic information in the temporary storage area for the subsequent process.

Figure 18:
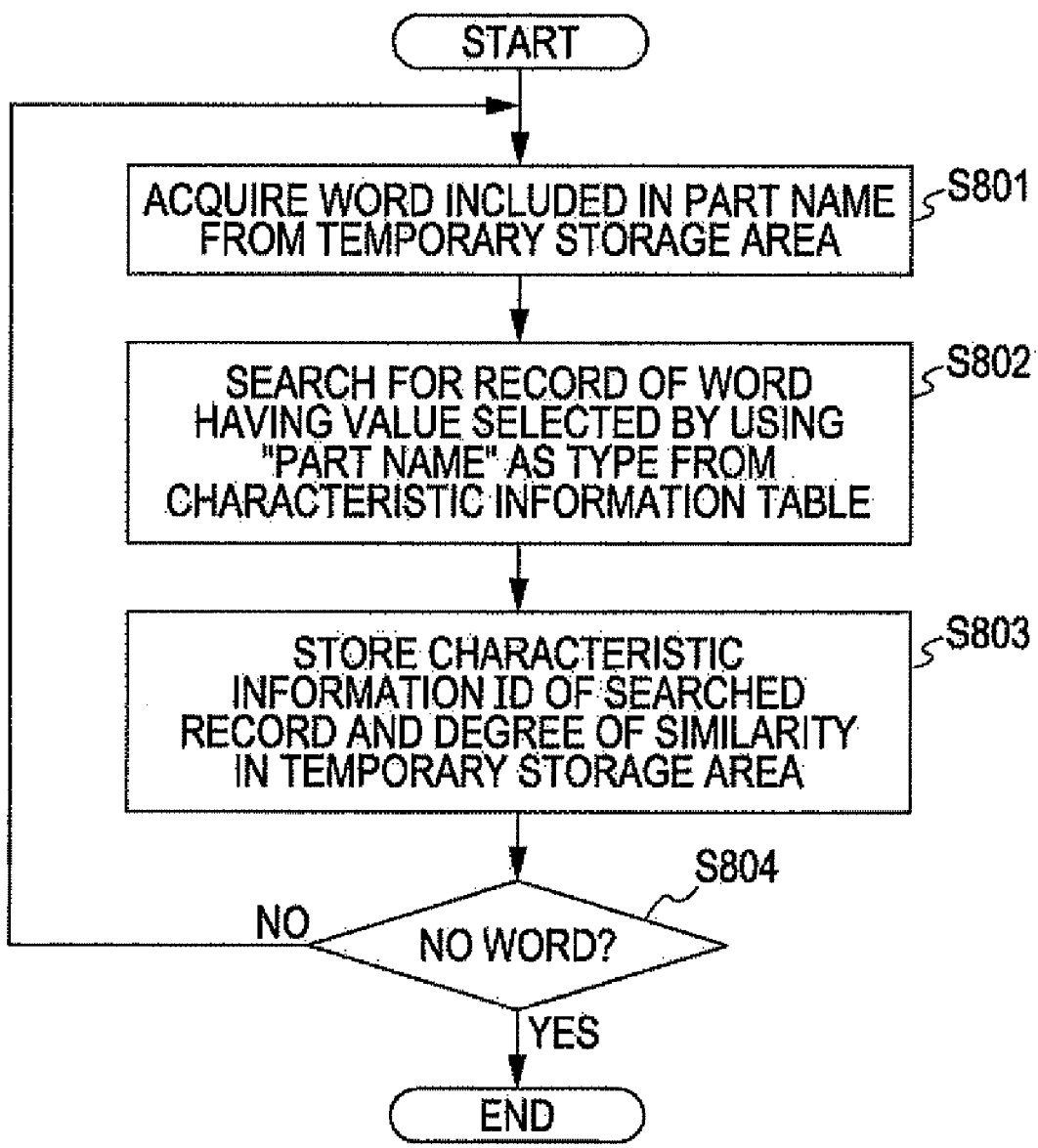
FIG. 18 is a flowchart illustrating a similar characteristic information searching process related to a part name.

FIG. 18 shows a similar characteristic information searching process related to a part name. The similar characteristic information searching process acquires one word constituting a part name stored in the temporary area (operation S801). The similar characteristic information searching process searches the characteristic information table for a record which is a word having a value acquired from the temporary storage area (operation S802). The similar characteristic information searching process stores information ID described in the searched record and the calculated similarity in the temporary storage area for the subsequent process (operation S803). In this case, a degree of similarity of the part name can be calculated by using, for example, 1/(a number of words constituting a part name). The similar characteristic information searching process returns to operation S801 when a word constituting an unprocessed part name is present in the temporary storage area (No in operation S804), and ends the process when the word constituting the part name is not present (Yes in operation S804).

A similar characteristic information searching process related to a material can be executed by the same manner as described above.

Figure 19:
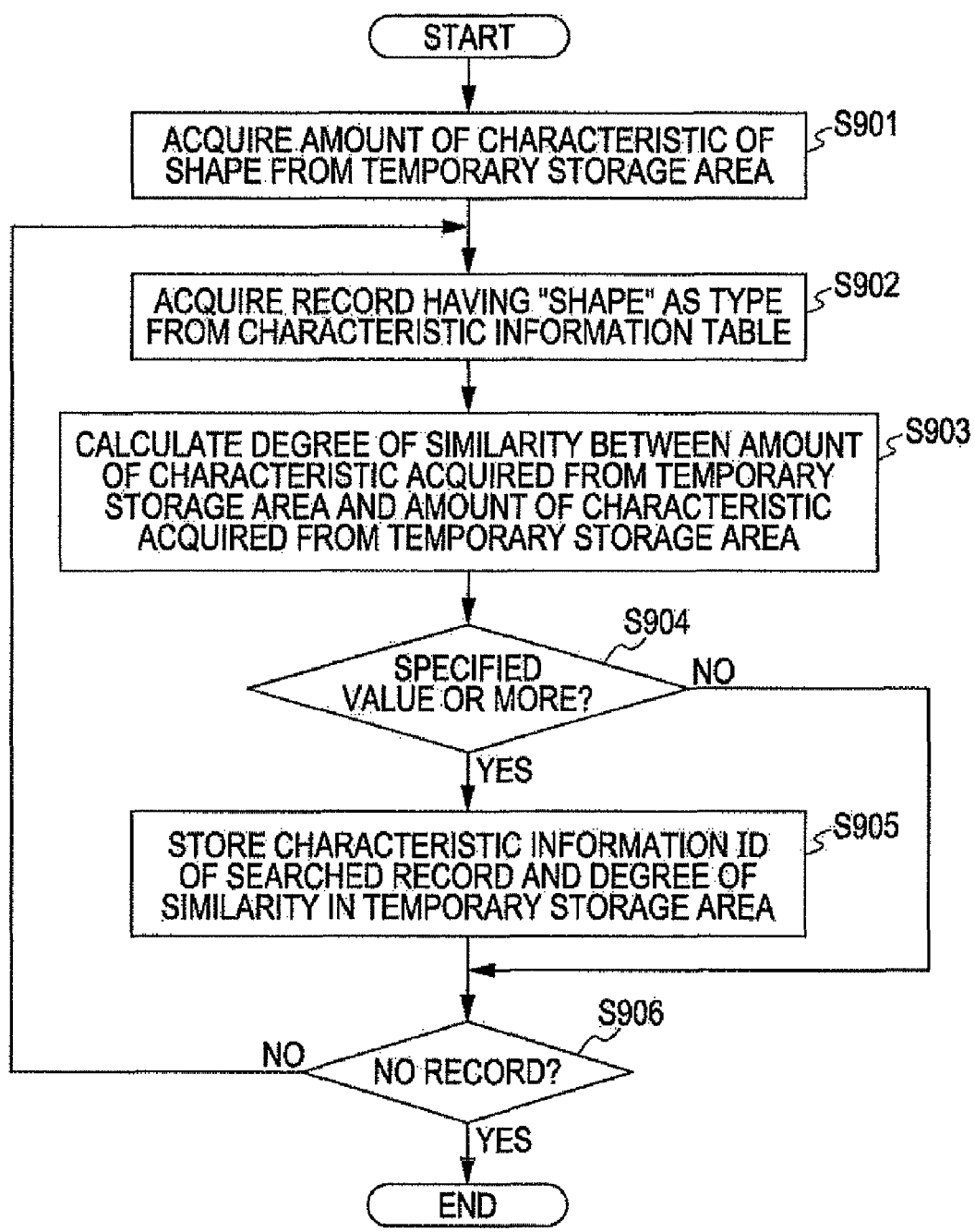
FIG. 19 is a flowchart illustrating a similar characteristic information searching process related to a shape.

FIG. 19 shows a similar characteristic information searching process related to a shape. This similar characteristic information searching process acquires an amount of characteristic of a shape from the temporary storage area (operation S901). The similar characteristic information acquires record (s) each having a type "shape" from the characteristic information table (operation S902), and a degree of similarity of an amount of characteristic acquired from the temporary storage area and an amount of characteristic acquired from the record is calculated (operation S903). As described above, an amount of characteristic of the shape corresponds to a histogram. The degree of similarity can be defined as an overlapping portion obtained when both histograms are drawn and overlapped. When a value is equal to or larger than a regulated value (Yes in operation S904), the similar characteristic information searching process stores, in the temporary storage area, characteristic information ID of the record searched from the characteristic information table and the calculated degree of similarity (operation S905). The characteristic information table includes a record having a type "shape" (No in operation S906), the similar characteristic information searching process returns to operation S902. When the record is not present (Yes in operation S906), the process is ended.

Similar characteristic information is searched for by a procedure suitable for each of other pieces of characteristic information, and characteristic information ID and a degree of similarity are stored in a temporary storage area for the subsequent process.

Figure 20:
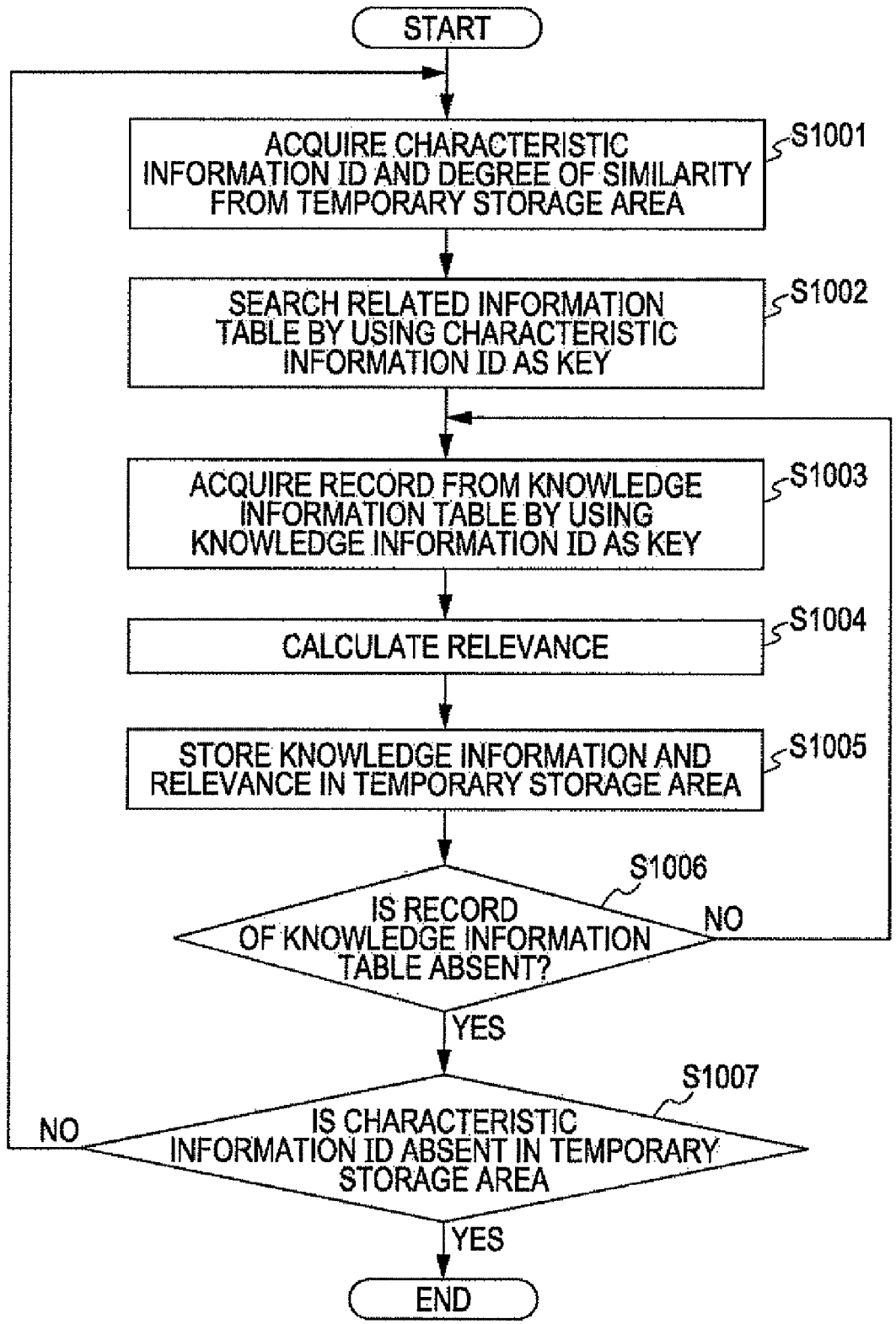
FIG. 20 is a flowchart illustrating a knowledge information searching process.

FIG. 20 shows a knowledge information searching process. The knowledge information searching process acquires a characteristic information ID and a degree of similarity stored in a temporary storage area (operation S1001), and searches a related information table for a record by using the characteristic information ID as a key (operation S1002). The knowledge information searching process acquires the knowledge information from the knowledge information table by using the knowledge information ID of the searched record as a key (operation S1003). From the characteristic information of the part selected in the design support system and the acquired knowledge information, a relevance between the characteristic information of the part selected in the design support system and the acquired knowledge information is calculated (operation S1004). The knowledge information searching process stores the knowledge information acquired from the knowledge information table and the calculated relevance in the temporary storage area for the subsequent process (operation S1005). When the knowledge information table includes an unprocessed record (No in operation S1006), the knowledge information searching process returns to operation S1003. When the knowledge information table does not include an unprocessed record (Yes in operation S1006), the knowledge information searching process shifts to the next process. When unprocessed characteristic information is present in the temporary storage area (No in operation S1007), the knowledge information searching process returns to operation S1001. When the unprocessed characteristic information is not present (Yes in operation S1007), the process is ended.

Figure 21:
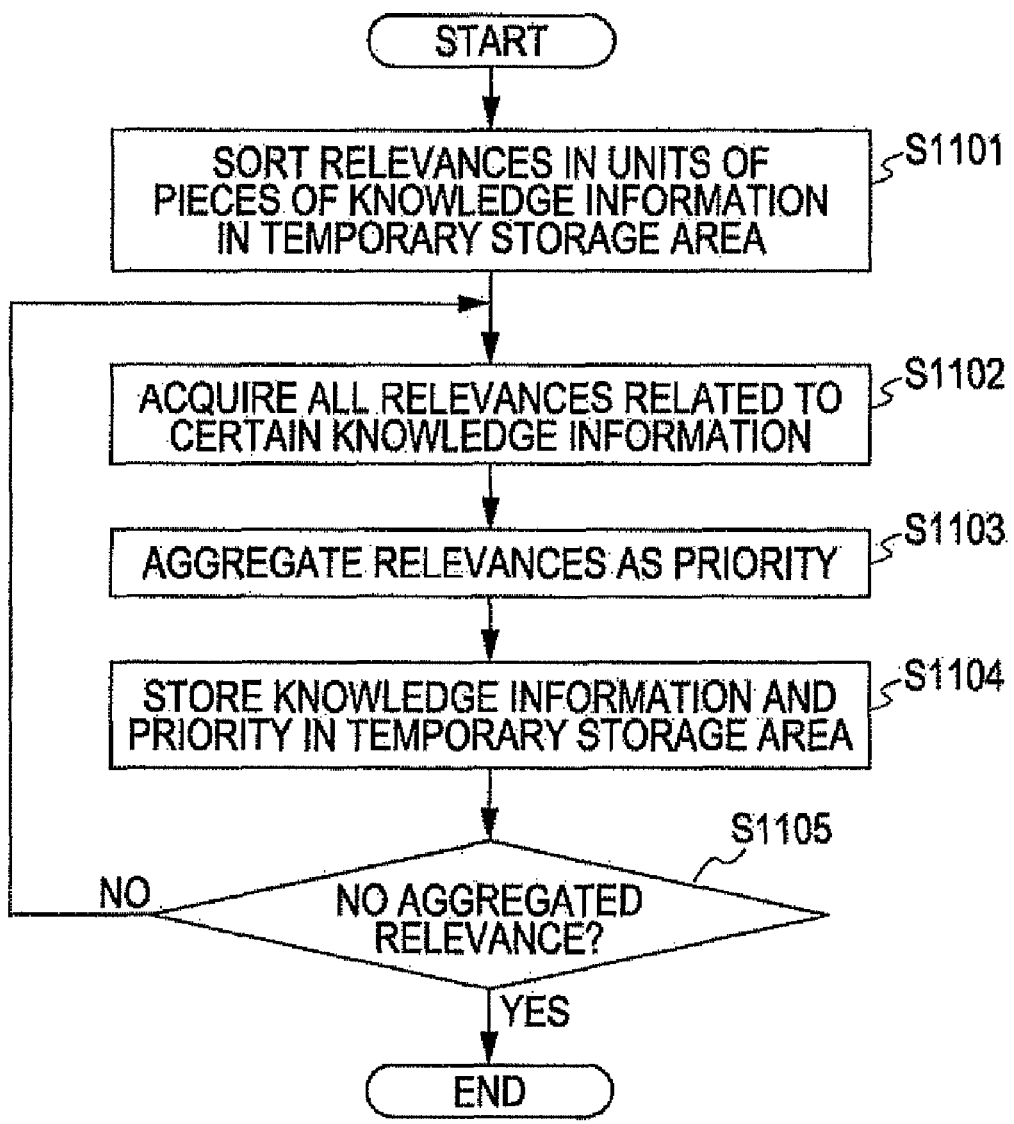
FIG. 21 is a flowchart illustrating a priority calculating process of knowledge information.

FIG. 21 shows a priority calculating process of knowledge information. The priority calculating process sorts relevance between characteristic information of a part selected in a design support system and acquired knowledge information for each of piece(s) of knowledge information stored in a temporary storage area (operation S1101). The priority calculating process acquires the sorted relevance (operation S1102). The priority calculating process aggregates all the acquired relevance and sets the resultant value as a priority (operation S1103). At this time, the priority calculating process may calculate a priority by simply adding the relevance. Alternatively the priority calculating process may properly weight and aggregate the relevance. The priority calculating process stores the knowledge information and the priority in the temporary storage area for the subsequent process (operation S1104). When uncalculated knowledge information is left in the temporary storage area (No in operation S1105), the priority calculating process returns to operation S1102. When the priorities are calculated for all the pieces of knowledge information (Yes in operation S1105), the process is ended.

Figure 10:
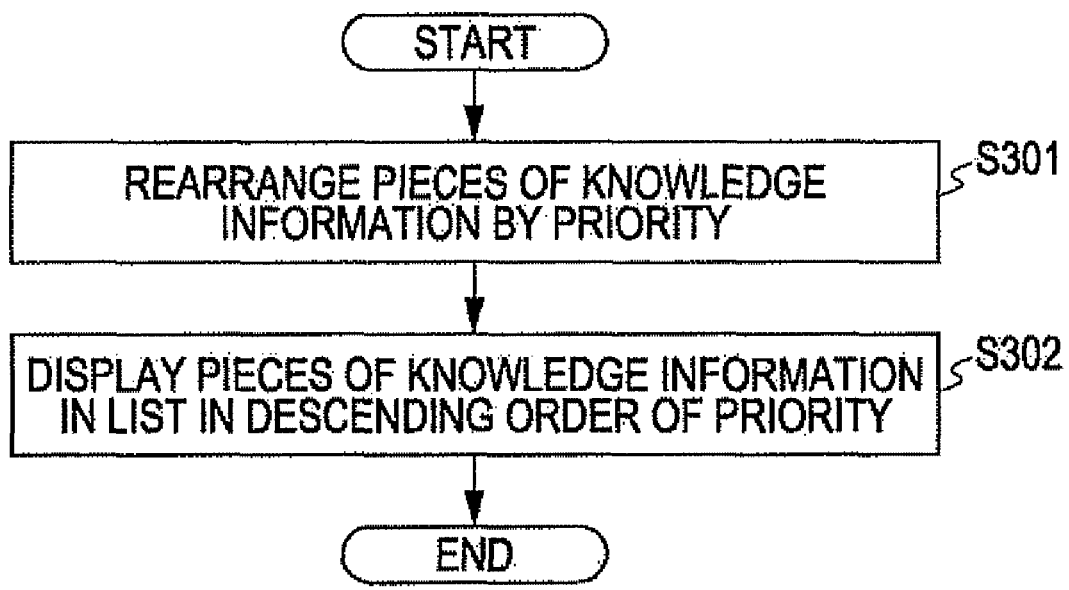
FIG. 10 is a flowchart illustrating a procedure of a knowledge information display process.

FIG. 10 shows a procedure of the knowledge information display process. As shown in FIG. 10, the pieces of knowledge information stored in the temporary storage area are rearranged depending corresponding priority (operation S301), and the pieces of knowledge information is listed and displayed in a descending order of priority (operation S302).

Figure 9:
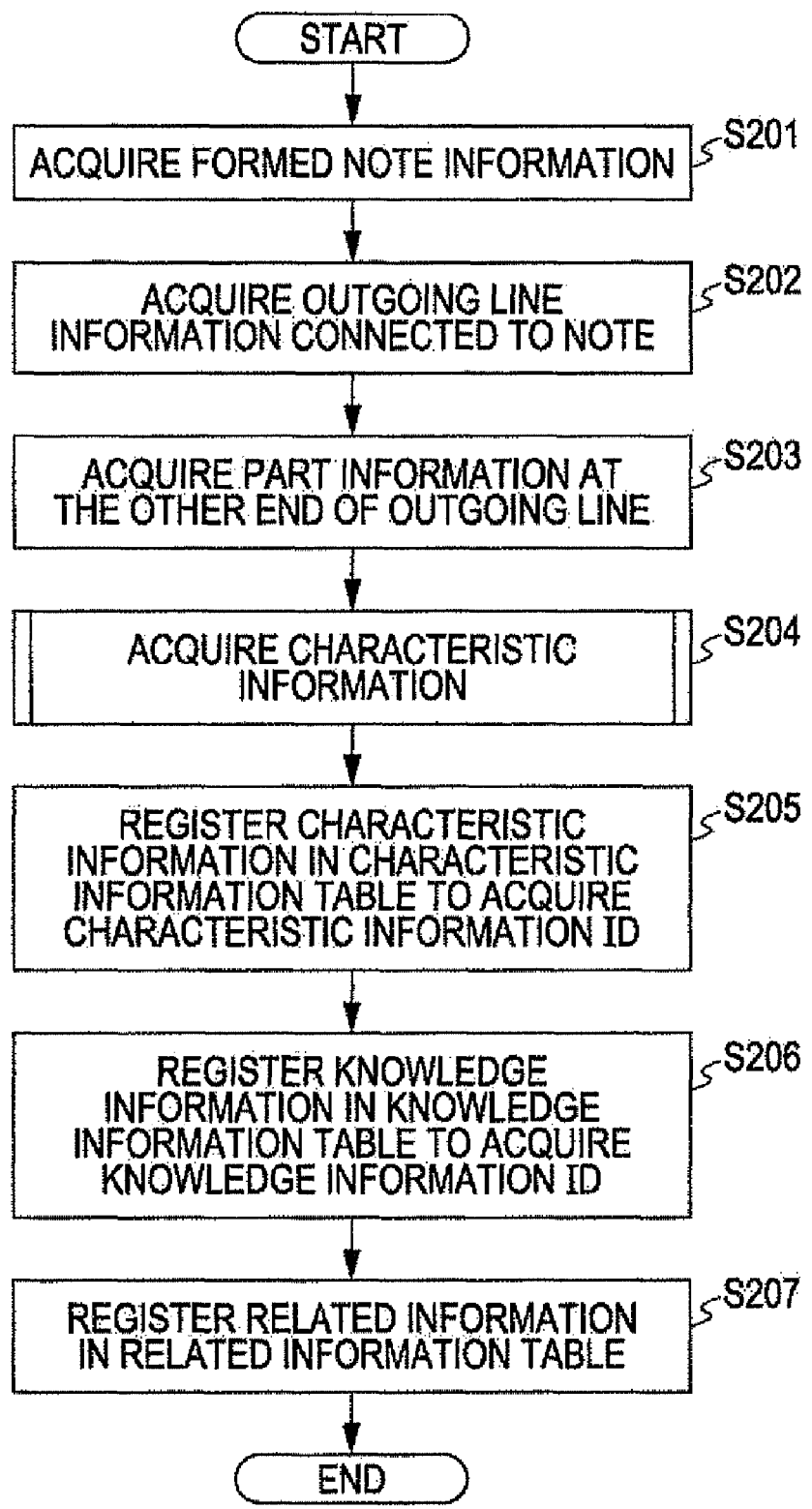
FIG. 9 is a flowchart illustrating a procedure of an information registering process.

FIG. 9 shows a procedure of an information registering process in formation of a note. The information registering unit 224 acquires the note information formed by the design related information editing unit as knowledge information (operation S201). The information registering unit 224 acquires information of a leader line (a pointer or an association) connected to the note (operation S202). From the leader line information acquired in operation S202, part information connected to the other end of the leader line is acquired (S203). In this case, when the other end of the leader line is not connected to a specific part, the information registering unit 224 may add a process of searching for a part closest to the end of the leader line. When the leader line is not present, the information registering unit 224 may set a part recently selected or an uppermost part (part expressing an entire device to be designed) as a corresponding part.

In operation S203, the information registering unit 224 acquires characteristic information related to the acquired part (operation S204). The process is the same as the process described in the flow charts shown in FIGS. 15, 16, and 17.

The information registering unit 224 registers the acquired characteristic information in the characteristic information table to acquire an characteristic information ID (operation S205). At this time, in order to prevent the same pieces of characteristic information from being registered in the characteristic information table, the information registering unit 224 searches the characteristic information table before registration. When the same characteristic information is registered, the registration is stopped, and the characteristic information ID of the existing characteristic information is acquired.

As in operation S205, the information registering unit 224 registers the knowledge information acquired from the note information in the knowledge information table to acquire a knowledge information ID (operation S206). At this time, in order to prevent the same pieces of knowledge information from being registered in the knowledge information table, the information registering unit 224 searches the knowledge information table once before registration. When the same pieces of knowledge information are registered, the registration is stopped, and the knowledge information ID of the existing knowledge information is acquired.

The information registering unit 224 registers related information in a related information table depending on the characteristic information ID, the knowledge information ID, and a properly regulated relevance (operation S207). At this time, in order to prevent the same pieces of knowledge information from being registered in the knowledge information table, the information registering unit 224 searches the related information table before registration. When the same pieces of related information are registered, the registration is stopped. The information registering unit 224 increases a relevance of the existing related information by a properly regulated value.

Figure 11:
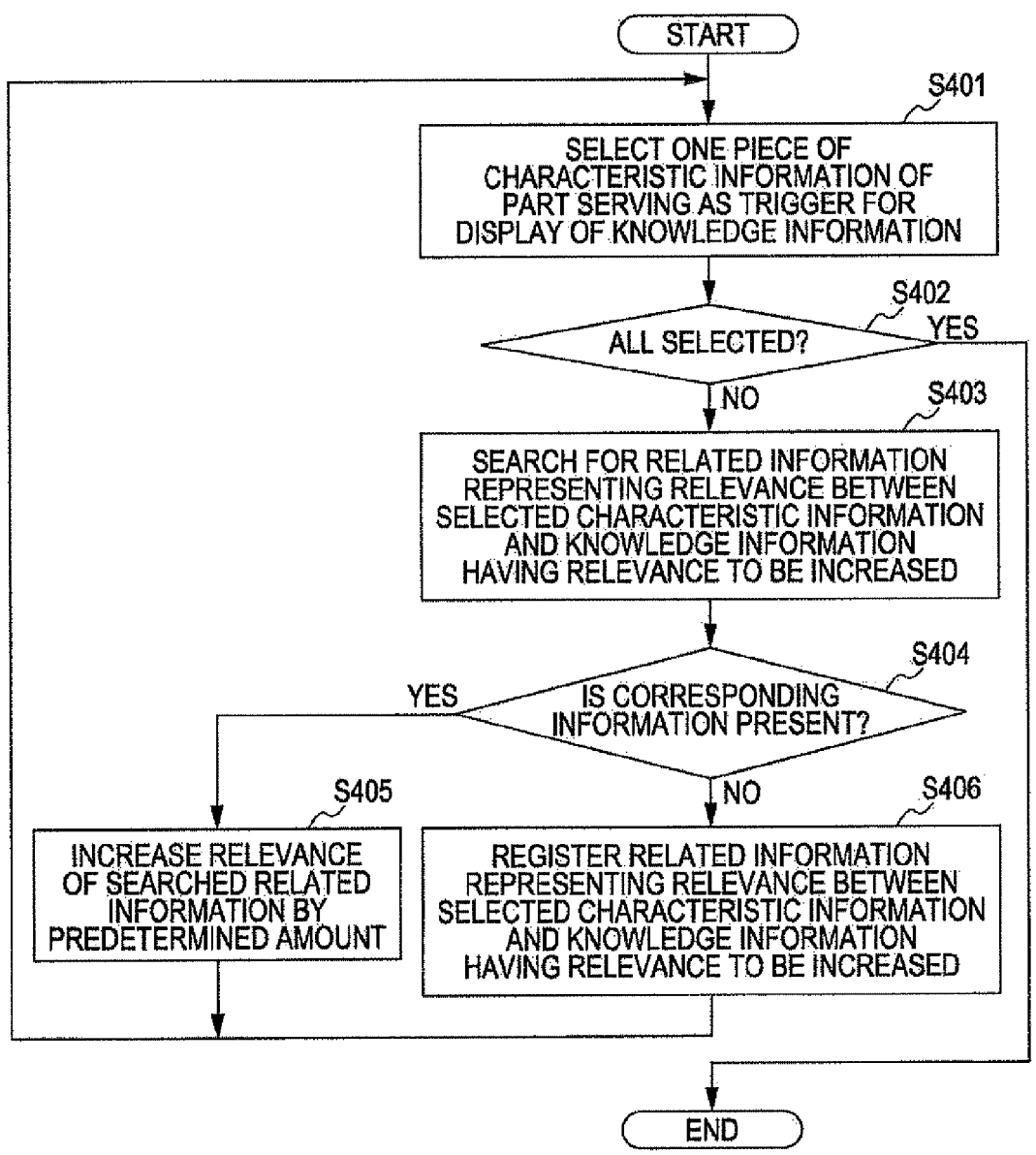
FIG. 11 is a flowchart illustrating a procedure of a relevance updating process.

FIG. 11 shows a procedure of a relevance updating process executed when detail(s) of specific knowledge information on an existing display screen of the knowledge information displayed by the knowledge information display unit 228 are required to be displayed. The relevance updating unit 229 selects one of pieces of characteristic information of a part serving as a trigger for displaying the knowledge information (operation S401). When the characteristic information can be selected (No in operation S402), the relevance updating unit 229 searches the related information table 113 for knowledge information, the relevance between the characteristic information and the knowledge information the relevance of which should be increased (operation S403).

When the corresponding related information is present (Yes in operation S404), the relevance updating unit 229 increases a relevance of the related information by a predetermined amount (operation S405). On the other hand, when the corresponding related information is not present (No in operation S404), the relevance updating unit 229 registers related information representing a relevance between the characteristic information and knowledge information the relevance of which should be increased (operation S406).

In this manner, when the relevance is updated with respect to a selected piece of characteristic information, the relevance updating unit 229 returns to operation S401 to try to select the next piece of characteristic information. In operation S401, when all the pieces of characteristic information are selected (Yes in operation S402), the relevance updating unit 229 ends the process.

The configuration of the terminal apparatus 200 shown in FIG. 1 can be variably changed without departing from the spirit and scope of the disclosed technique. For example, a function of the control unit 220 of the terminal apparatus 200 is provided as software, and the software is executed by a computer, so that the same function as that of the terminal apparatus 200 can be realized. An example of a computer which executes a program on which the function of the control unit 220 is mounted as software will be described as an example.

Figure 12:
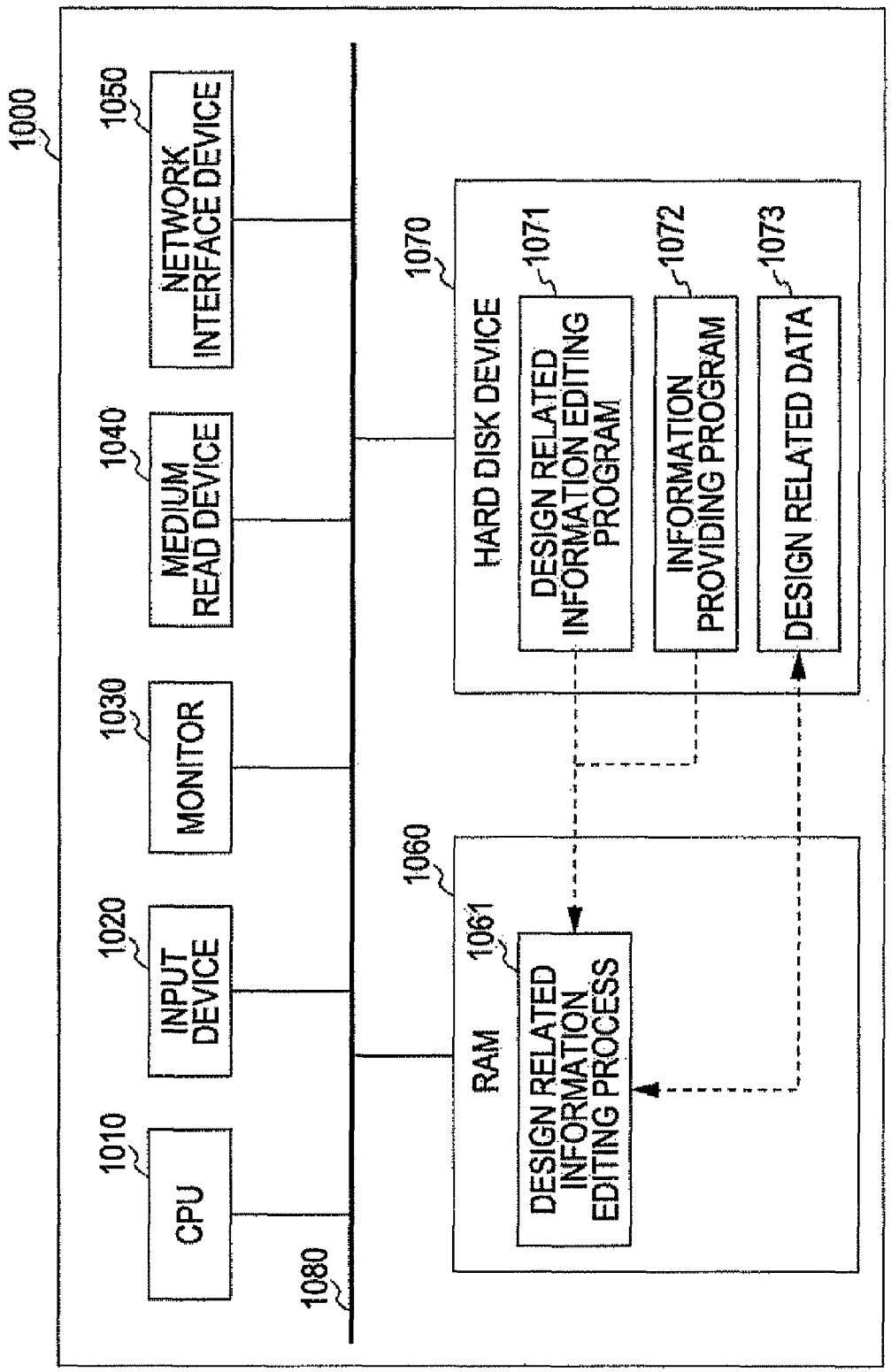
FIG. 12 is a diagram illustrating a computer which executes an information providing program.

FIG. 12 shows a computer 1000 which executes an information providing program 1072. As shown in FIG. 12, the computer 1000 may include a CPU (Central Processing Unit) 1010 which executes various arithmetic process, an input device 1020 which accepts an input of data from a user, a monitor (display) 1030 which displays various pieces of information, a medium read device 1040 which reads a program or the like from a recording medium, a network interface device 1050 which gives and receives data to/from another computer through a network, a RAM (Random Access Memory) 1060 which temporarily stores various pieces of information, and a hard disk device 1070. These devices are connected by a bus 1080.

The hard disk device 1070 stores a design related information editing program 1071 having the same function as that of the design related information editing unit 221 of the control unit 220 shown in FIG. 1, an information providing program 1072 having the same function as that of each processing unit except for the design related information editing unit 221 of the control unit 220, and design related data 1073 corresponding to the design related information 211 stored in the storage unit 210 shown in FIG. 1.

The CPU 1010 reads the design related information editing program 1071 and the information providing program 1072 from the hard disk device 1070 and executes operation(s) of the design related information editing program 1071 and the information providing program 1072, so that these programs integrally function as a design related information editing process 1061. The design related information editing process 1061 provides the information or the like read from the design related data 1073 in a region properly allocated to the design related information editing process 1061 on the RAM (Random Access Memory) 1060, and various data processes are executed on the basis of the developed data or the like.

The design related information editing program 1071 and the information providing program 1072 are not always be stored in the hard disk device 1070. The programs may be stored in a storage medium such as a CD-ROM. The programs may be stored in another computer (or a server) connected to the computer 1000 through a public line, the Internet, a LAN (Local Area Network), a WAN (Wide Area Network), or the like. The computer 1000 reads the program stored as described above and executes the programs.

The design related information editing program 1071 and the information providing program 1072 may be an integrated program.

In the embodiment, the function of searching for knowledge information on the basis of design related information is described. However, the terminal apparatus 200 and the information providing program 1072 may have the function of searching for design related information on the basis of knowledge information.

For example, when the details of a certain piece of knowledge information are displayed, the terminal apparatus 200 searches the related information table 113 to acquire characteristic information ID of characteristic information related to the knowledge information. The terminal apparatus 200 displays a part having a characteristic similar to pieces of characteristic information represented by characteristic information IDs acquired on a display screen as a highlight. A user can know another part related to the displayed knowledge information. In this case, on the display, a part can be changed in color or brightness depending on relevance.

Pieces of knowledge information registered in the server may be used as a check list used in a product shipping state or the like. In this case, each check item in the check list corresponds to one of the pieces of knowledge information. When a user calls the check list to select a proper check item, the terminal apparatus 200 displays a part related to the knowledge information corresponding to the checked item as a highlight by the above procedure. As a result, the user can easily confirm design quality or the like.

As described above, the disclosed system and method automatically provides knowledge information related to a part to be worked by a user to the user. Therefore, the user can effectively utilize the knowledge information. In an embodiment, knowledge information or the like related to a part to be worked by a user is automatically registered in a database. Therefore, the pieces of knowledge information are effectively accumulated.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An information providing system comprising:
   a part related information editing unit editing information related to a part according to a user operation;
   a characteristic information extracting unit extracting characteristic information representing a characteristic of the part from information of an object to be subjected to editing responsive to the user operation that selects the part;
   a characteristic information searching unit searching a database for information similar to the characteristic information;
   a knowledge information searching unit searching the database for knowledge information related to the characteristic information; and
   a knowledge information display unit displaying the knowledge information on a display unit, where the knowledge information and the characteristic information resulting from said searching are registered in correspondence to each other in accordance with the user operation related to said editing.

2. The information providing system according to claim 1, comprising:
   a relevance calculating unit calculating a relevance representing a strength of a relationship between the characteristic information and the knowledge information, and wherein the knowledge information display unit determines a priority for displaying the knowledge information.

3. The information providing system according to claim 2, wherein the relevance calculating unit calculates the relevance between the characteristic information extracted and the knowledge information searched based on a degree of similarity between the characteristic information and the knowledge information and related information which holds a relevance between the characteristic information and the knowledge information.

4. The information providing system according to claim 2, comprising:
   a relevance updating unit, when an operation required by display of detailed information of the knowledge information displayed is performed, updating the relevance between the characteristic information and the knowledge information depending on a display time of the detailed information.

5. The information providing system according to claim 4, wherein the relevance updating unit decreases a relevance of data obtained when a predetermined period of time has passed after the relevance is finally increased, among the data included in the related information.

6. The information providing system according to claim 1, comprising:
   a knowledge information extracting unit extracting knowledge information related to the part from information to be edited by the part related information editing unit when the operation to select the part is performed in the part related information editing unit; and
   an information registering unit registering the characteristic information and the knowledge information in the database.

7. The information providing system according to claim 6, wherein the information registering unit registers related information representing a relevance between characteristic information to be registered and knowledge information in the database when the characteristic information and the knowledge information are registered in the database.

8. The information providing system according to claim 1, wherein the characteristic information extracting unit extracts an amount of characteristic of a shape of a target part as one piece of the characteristic information.

9. A computer readable storage medium storing a program to cause a computer to operate as an information providing apparatus and execute operations, the operations comprising:
   editing information related to a part according to a user operation;
   extracting characteristic information representing a characteristic of the part from information of an object to be subjected to said editing responsive to the user operation that selects the part;
   searching a database for information similar to the characteristic information;
   searching the database for knowledge information related to the characteristic information; and
   displaying the knowledge information on a display unit, where the knowledge information and the characteristic information resulting from said searching are registered in correspondence to each other in accordance with the user operation related to said editing.

10. A method for providing information comprising:
    editing information related to a part according to a user operation;
    extracting characteristic information representing a characteristic of the part from information of an object to be subjected to said editing responsive to the user operation that selects the part;
    searching a database for information similar to the characteristic information;

searching the database for knowledge information related to the characteristic information; and displaying the knowledge information on a display unit, where the knowledge information and the characteristic information resulting from said searching are registered in correspondence to each other in accordance with the user operation related to said editing.

11. A method of providing knowledge information, comprising:

editing information related to a part according to a user operation;

extracting characteristic information of the part from information of an object to be subjected to said editing responsive to the user operation that selects the part;

searching a database for information similar to the characteristic information;

searching for knowledge information corresponding to the characteristic information of said part using a piece of said characteristic information as a key; and displaying the knowledge information on a display unit, where the knowledge information is registered in correspondence with the characteristic information as a result of said searching in accordance with the user operation related to said editing.

* * * * *